(12) United States Patent
Venkatachalam et al.

(10) Patent No.: US 8,949,454 B2
(45) Date of Patent: Feb. 3, 2015

(54) METHODS AND APPARATUSES FOR IP ADDRESS ALLOCATION

(75) Inventors: Muthaiah Venkatachalam, Beaverton, OR (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 12/797,280

(22) Filed: Jun. 9, 2010

(65) Prior Publication Data

US 2011/0047289 A1  Feb. 24, 2011

Related U.S. Application Data

(60) Provisional application No. 61/275,266, filed on Aug. 24, 2009.

(51) Int. Cl.
  *G06F 15/16* (2006.01)
  *H04L 12/28* (2006.01)
  *H04W 4/00* (2009.01)
  *G06F 15/177* (2006.01)
  *H04W 72/08* (2009.01)
  (Continued)

(52) U.S. Cl.
  CPC ............ *H04W 72/085* (2013.01); *H04W 80/04* (2013.01); *H04W 8/26* (2013.01); *H04L 61/2015* (2013.01); *H04M 7/0069* (2013.01); *G08C 2201/41* (2013.01); *G08C 17/02* (2013.01); *H04W 72/0453* (2013.01); *Y02B 60/50* (2013.01)
  USPC ............ 709/237; 370/254; 370/338; 709/220

(58) Field of Classification Search
  CPC ................ H04L 61/2015; H04L 61/10; H04L 29/12018
  USPC ..................... 380/270; 370/419; 709/250, 237
  See application file for complete search history.

(56) References Cited

U.S. PATENT DOCUMENTS 6,707,813 B1 * 3/2004 Hasan et al. .................. 370/356
7,546,385 B1 * 6/2009 Henry et al. .................. 709/250
(Continued)

FOREIGN PATENT DOCUMENTS

CN         1744613 A      3/2006
CN       101098347 A      1/2008
(Continued)

OTHER PUBLICATIONS

International Search Report and Written Opinion for International Patent Application No. PCT/US2010/046368, Mailed Apr. 15, 2011, 8 pages.

(Continued)

*Primary Examiner* — Arvin Eskandarnia
*Assistant Examiner* — Margishi Desai
(74) *Attorney, Agent, or Firm* — Cool Patent, P.C.

(57) ABSTRACT

A method for IP address allocation is presented. In one embodiment, the method includes receiving DHCP (Dynamic Host Configuration Protocol) information by a driver module operable on a mobile station prior to the mobile station sending a DHCP discovery message. The method includes storing, by the driver module, the DHCP information and redirecting the DHCP discovery message from an operating system DHCP process to the driver module. The method also includes performing DHCP hand-shaking in response to the DHCP discovery message.

16 Claims, 5 Drawing Sheets

(51) Int. Cl.
*H04W 80/04* (2009.01)
*H04W 8/26* (2009.01)
*H04L 29/12* (2006.01)
H04M 7/00 (2006.01)
G08C 17/02 (2006.01)
H04W 72/04 (2009.01)

(56) References Cited

U.S. PATENT DOCUMENTS

| | | | |
|---|---|---|---|
| 7,710,933 B1* | 5/2010 | Sundaralingam et al. | 370/338 |
| 8,005,083 B1* | 8/2011 | Diep | 370/389 |
| 2003/0177187 A1* | 9/2003 | Levine et al. | 709/205 |
| 2005/0177829 A1* | 8/2005 | Vishwanath | 717/177 |
| 2005/0180326 A1* | 8/2005 | Goldflam et al. | 370/231 |
| 2005/0198235 A1* | 9/2005 | Kumar et al. | 709/222 |
| 2005/0232228 A1* | 10/2005 | Dharanikota et al. | 370/351 |
| 2006/0050673 A1 | 3/2006 | Park et al. | |
| 2006/0092861 A1* | 5/2006 | Corday et al. | 370/256 |
| 2006/0171406 A1* | 8/2006 | Kwon et al. | 370/419 |
| 2006/0200494 A1* | 9/2006 | Sparks | 707/104.1 |
| 2006/0259539 A1* | 11/2006 | Martikian | 709/202 |
| 2007/0110244 A1* | 5/2007 | Sood et al. | 380/270 |
| 2007/0204155 A1 | 8/2007 | Dutta et al. | |
| 2008/0130647 A1 | 6/2008 | Ohba et al. | |
| 2008/0270795 A1* | 10/2008 | Lonardo et al. | 713/168 |
| 2009/0041252 A1* | 2/2009 | Hanna | 380/278 |
| 2009/0132682 A1* | 5/2009 | Counterman | 709/220 |
| 2009/0193103 A1* | 7/2009 | Small et al. | 709/221 |
| 2010/0075751 A1* | 3/2010 | Garvey et al. | 463/30 |
| 2010/0107231 A1* | 4/2010 | Kavanagh et al. | 726/7 |

FOREIGN PATENT DOCUMENTS

| | | |
|---|---|---|
| JP | 2007-536872 A | 12/2007 |
| KR | 1020030058267 A | 7/2003 |
| KR | 1020050027454 A | 9/2003 |
| KR | 20060091877 | 8/2006 |
| KR | 10-2009-0045442 A | 5/2009 |
| WO | 2005/109768 A1 | 11/2005 |
| WO | 2007/121295 A2 | 10/2007 |
| WO | 2011/028487 A2 | 3/2011 |
| WO | 2011/028487 A3 | 6/2011 |

OTHER PUBLICATIONS

Office Action received for Korean Patent Application No. 10-2012-7004708, mailed on May 29, 2013, 10 Pages of Office action including 5 Pages of English Translation.
Office Action received for Japanese Patent Application No. 2012-526887, mailed on Apr. 16, 2013, 3 Pages of Office action including 2 Pages of English Translation.
Office Action received for Chinese Patent Application No. 201080038317.4 mailed on Dec. 24, 2013.
Office Action received for Chinese Patent Application No. 201080038317.4, mailed on Aug. 29, 2014, 28 pages of Office Action including 20 pages of English Translation.

* cited by examiner

METHODS AND APPARATUSES FOR IP ADDRESS ALLOCATION

CROSS-REFERENCE TO RELATED APPLICATIONS

This application claims the benefit of U.S. Provisional Application No. 61/275,266, filed on Aug. 24, 2009, entitled "Advanced Broadband Wireless Communication Systems And Methods", and the contents of which incorporated herein by reference as if set forth herein in full.

FIELD OF THE INVENTION

Embodiments of the invention relate to wireless communication systems; more particularly, embodiments of the invention relate to IP (Internet Protocol) address allocations.

BACKGROUND OF THE INVENTION

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals.

A network entry process, in conjunction with the WiMAX technology, includes initial ranging, basic capability negotiation, authentication, MAC negotiation (registration), QoS negotiation (service flow initialization), and obtaining IP address via Dynamic Host Configuration Protocol (DHCP).

DHCP has been the way to obtain an IP address and the convention is an integral part of network services in many operating systems. The DHCP phase is among the last step of the network entry process. It generally takes several seconds over wireless networks to obtain an IP address. In addition, missing packets during DHCP also increase the latency of the process.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
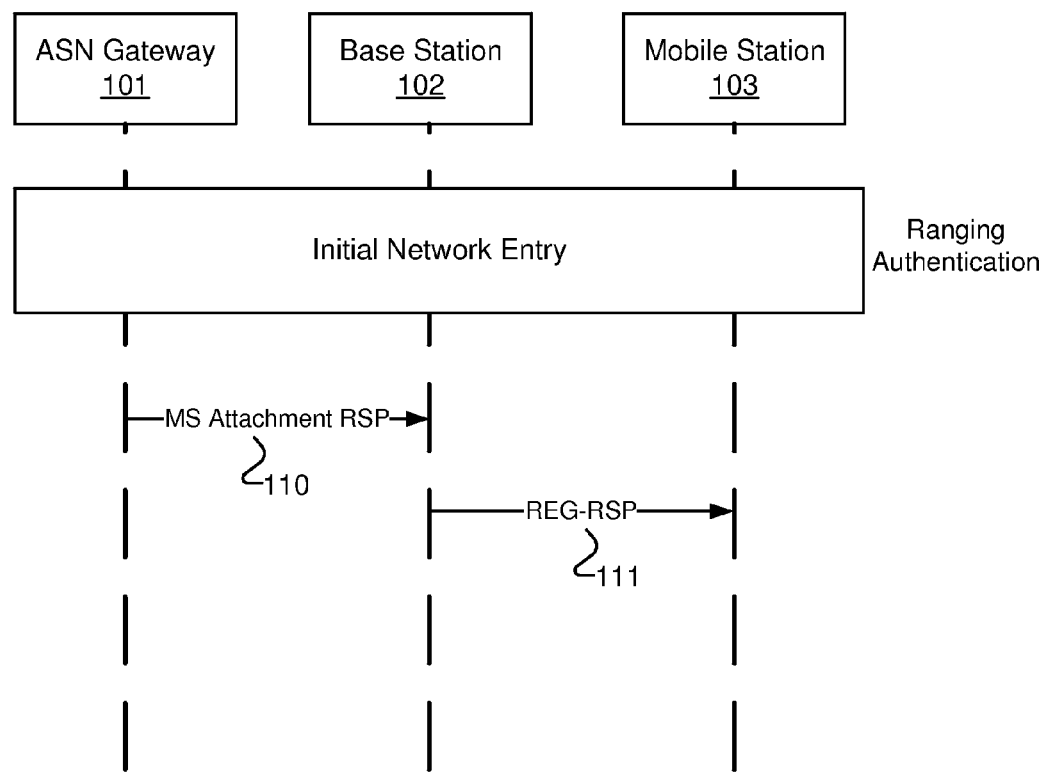
FIG. 1 shows a flow diagram of one embodiment of a process to obtain an IP address in conjunction with a registration phase.

A method for IP (Internet Protocol) address allocation is presented. In one embodiment, the method includes receiving DHCP (Dynamic Host Configuration Protocol) information by a driver module operable on a mobile station prior to the mobile station sending a DHCP discovery message. The method includes storing, by the driver module, the DHCP information and redirecting the DHCP discovery message from an operating system DHCP process to the driver module. The method also includes performing DHCP hand-shaking in response to the DHCP discovery message.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for IP address allocation. Specifically, IP address allocation is discussed in reference to multi-core processor computer systems. However, the methods and apparatus for IP address allocation are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

A method for IP (i.e., Internet Protocol) address allocation is presented. In one embodiment, the method includes receiving DHCP (Dynamic Host Configuration Protocol) information by a driver module operable on a mobile station prior to the mobile station sending a DHCP discovery message. The method includes storing, by the driver module, the DHCP information and redirecting the DHCP discovery message from an operating system DHCP process to the driver module. The method also includes performing DHCP hand-shaking in response to the DHCP discovery message.

FIG. 1 shows a flow diagram of one embodiment of a process to obtain an IP address in conjunction with a registration phase. Many related components peripherals have not been shown to avoid obscuring the invention. Referring to FIG. 1, the system includes ASN (access service network) gateway 101, base station 102, and mobile station 103.

In one embodiment, ASN gateway 101 is also a DHCP proxy server or a DHCP server. In one embodiment, ASN control is handled by ASN gateway 101 and base station 102. The control plane of ASN gateway 101 handles radio-independent control and feature set includes authorization, authentication, and accounting (AAA), context management, profile management, service flow authorization, paging, radio resource management, and handover. The data plane feature set of ASN gateway 101 includes mapping radio bearer to the IP networks, packet inspection, tunneling, admission control, policing, QoS (Quality of Service) measurement, and data forwarding.

In one embodiment, ASN gateway 101 has the authenticator and key distributor to implement AAA framework along with AAA relay in order to transmit signals to AAA servers wherein the user credentials during network re-entry are verified with EAP authentication. Security context is created during AAA session and keys (MSK and PSK) are generated and shared with base station 102 and mobile station 103. AAA modules in the ASN gateway 101 provides flow information for accounting because detail about a flow (e.g., transferred or received number of bits, duration, and applied policy) is present and directly retrievable from the data plane.

In one embodiment, ASN gateway 101 performs profile management together with policy function residing in the connectivity network. Profile management identifies the user and the subscribed credentials (e.g., allowed QoS rate, number of flows, type of flows).

In one embodiment, ASN gateway 101 is a gateway operable to allocate a IP address to mobile station 103. In one embodiment, ASN gateway 101 includes a number of base stations including base station 102. Mobile station 103 communicates with ASN gateway 101 via base station 102.

In one embodiment, mobile station 103 performs a network entry to the network associated with ASN gateway 101. In response to the network entry, ASN gateway 101 generates DHCP information prior to receiving a DHCP discovery message sent from mobile station 103. The DHCP information includes an IP address to be assigned to mobile station 103 and other configuration data in conjunction to the network protocol. In one embodiment, base station 102 propagates the DCHP information to mobile station 103.

In one embodiment, during initial network entry process, ASN gateway 101 sends the DHCP information to base station 102 in conjunction with a MAC negotiation message (e.g., MAC attachment response 110). In one embodiment, base station 102 propagates the DHCP information to mobile station 103 in conjunction with a registration message, for example, registration response (REG-RSP) 111. In one embodiment, the MAC negotiation message is an MS attachment response and the registration message is an REG-RSP message.

In one embodiment, mobile station 103 receives the IP address and additional IP configuration info (e.g., DCHP options) during the registration phase of the network entry. Mobile station 103 receives the DHCP information via the REG-RSP (MAC management message) in an unsolicited manner (or before mobile station 103 sending a DHCP discovery message). The DHCP information includes an IP address to be assigned to mobile station 103 and configuration data about a default gateway, a subnet mask, and a lease time.

In one embodiment, mobile station 103 includes a DHCP driver module (not shown). The DHCP driver module (acting as a spoof, a hidden proxy, or an agent) is installed on mobile station 103 in conjunction with the wireless (e.g., 802.16m) interface driver. In one embodiment, The DHCP service provided by an operating system (OS) is not expected to change. The OS performs DHCP as usual. The DHCP driver module intercepts the DHCP messages coming from/directed to the OS stack. The driver module obtains an IP address from the wireless network in conjunction with the process described above. The driver module responds to the OS stack with the DHCP information.

In one embodiment, the driver module is able to generate a REG-REQ message indicating that mobile station 103 is capable of receiving the DHCP information in conjunction with a REG-RSP message. The driver module redirects a DHCP discovery message by DHCP OS services (OS processes) to itself and performs DHCP hand-shaking. The DHCP hand-shaking includes: generating a response to the DHCP discovery message without sending out a request a remote DHCP gateway, communicating the DHCP information to the DHCP OS services, and communicating the DHCP acknowledgment to the OS DHCP services.

In one embodiment, the IP allocation process is performed in conjunction with advanced air interface (AAI). In one embodiment, in conjunction with AAI_REG-REQ, the host configuration capabilities and parameters includes: 1) host configuration capability indicator IE (information element): indicates whether the AMS (Advanced mobile station) supports the capability of configuring a host using the received parameters through the AAI_REG-RSP message. The one bit indicator is not included if Requested-Host-Configurations IE is included in the message; and 2) Requested-Host-Configuration IE: includes requested host configuration options in DHCP options format. If included, this IE indicates that the AMS supports host configuration using AAI_REG-RSP message, and Host-Configuration-Capability-Indicator IE shall be omitted.

In one embodiment, in conjunction with AAI_REG-RSP, the host configuration capabilities and parameters includes: 1) IPv6-Home-Network-Prefix IE: the allocated IPv6 Home Network Prefix for the AMS; and 2) Additional-Host-Configurations IE: includes additional host configuration options in DHCP Options format.

In one embodiment, the IP allocation method is applicable to various wireless mobile network standards, for example, IEEE 802.16m, Long Term Evolution (LTE), and extensions thereof.

Figure 2:
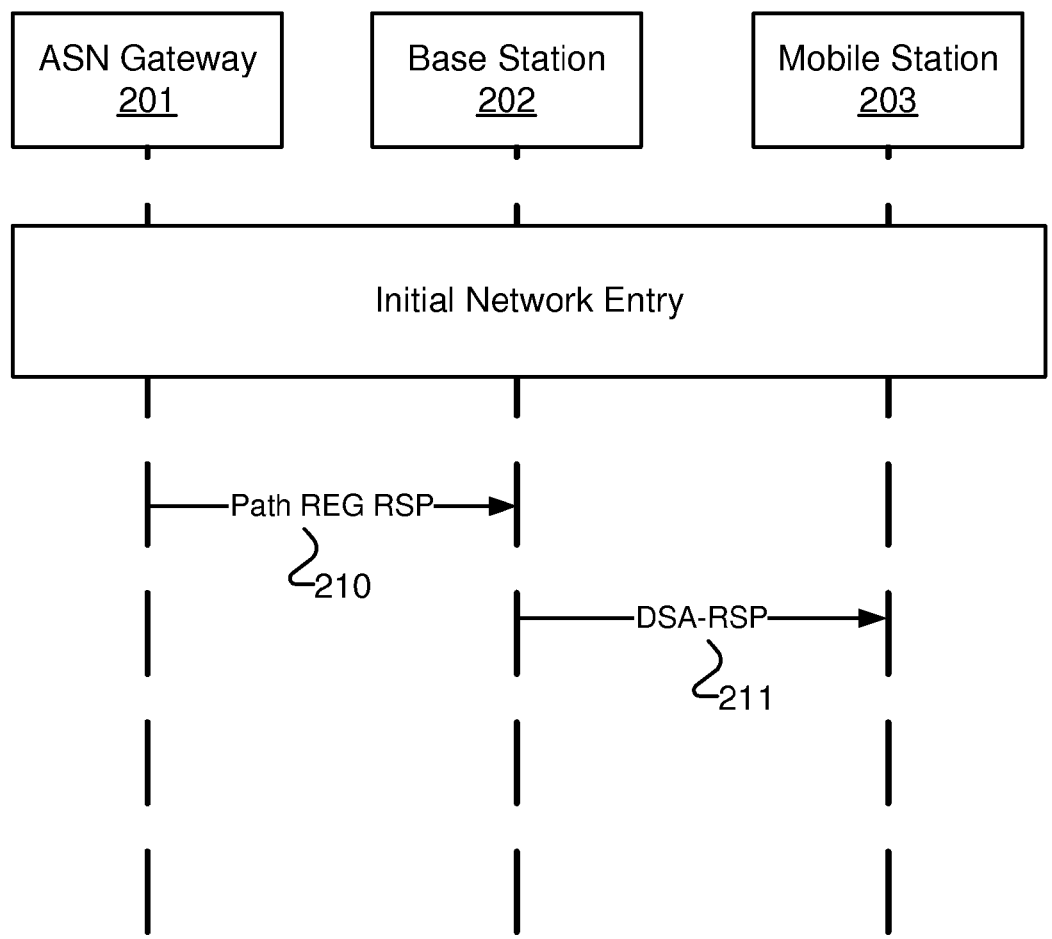
FIG. 2 shows a flow diagram of one embodiment of a process to obtain an IP address in conjunction with a service flow setup phase.

FIG. 2 shows a flow diagram of one embodiment of a process to obtain an IP address in conjunction with a service flow setup phase.

In one embodiment, during initial network entry process, ASN gateway 201 sends DHCP information to base station 202 in conjunction with a path registration message. Base station 202 propagates the DHCP information to mobile station 203 in conjunction with a service flow configuration message. In one embodiment, the path registration message is a PATH-REG response and the service flow configuration message is a DSA-RSP message.

In one embodiment, mobile station 203 receives an IP address and additional IP configuration information (e.g., DCHP options) during the Initial service flow setup. The DHCP proxy in ASN gateway 201 sends the DHCP information to base station 202 during the Initial network entry process of mobile station 203 via Path-REG-RSP 210. Mobile station 203 receives the DHCP information via the DSA-RSP 211 (MAC management messages) from base station 202 during the Initial service flow setup in an unsolicited manner (not requested by mobile station 203).

Figure 3:
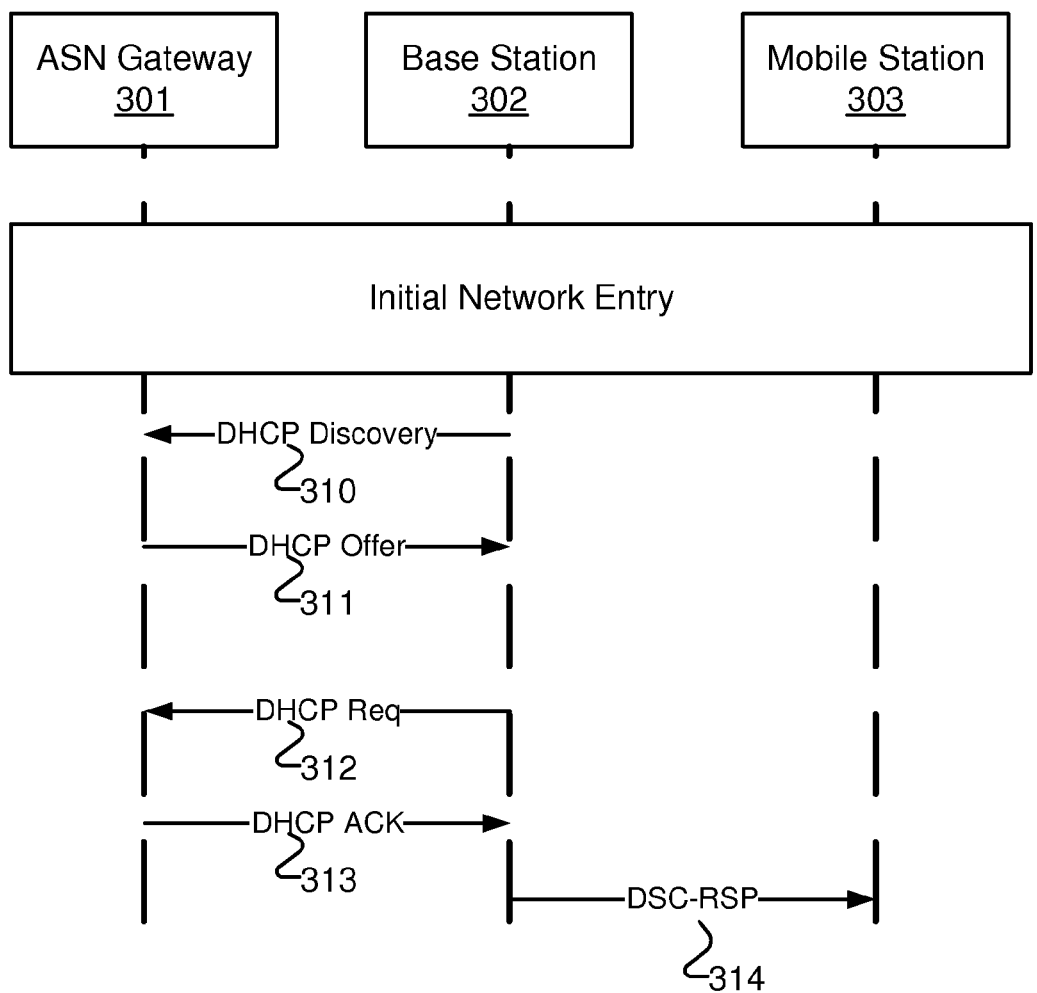
FIG. 3 shows a flow diagram of one embodiment of a process to obtain an IP address initiated by a base station.

FIG. 3 shows a flow diagram of one embodiment of a process to obtain an IP address initiated by a base station.

In one embodiment, base station 302 requests DHCP information from ASN gateway 301 in conjunction with DHCP messaging. In one embodiment, DHCP messaging includes DHCP discovery 310, DHCP offer 311, DHCP request 312, and DHCP ACK 313. Base station 302 propagates the DHCP information to mobile station 303 via a "service flow change" message. In one embodiment, the service flow change message is a DSC-RSP message.

In one embodiment, after initial network entry by mobile station 303 is completed and initial service flow is established, base station 302 performs DHCP messaging with the DHCP proxy in ASN gateway 301 on behalf of mobile station 303. Base station 302 obtains the IP Address and IP configuration information for mobile station 303. Base Station provides the IP address and IP configuration information to mobile station via the DSC-RSP (MAC management message).

Figure 4:
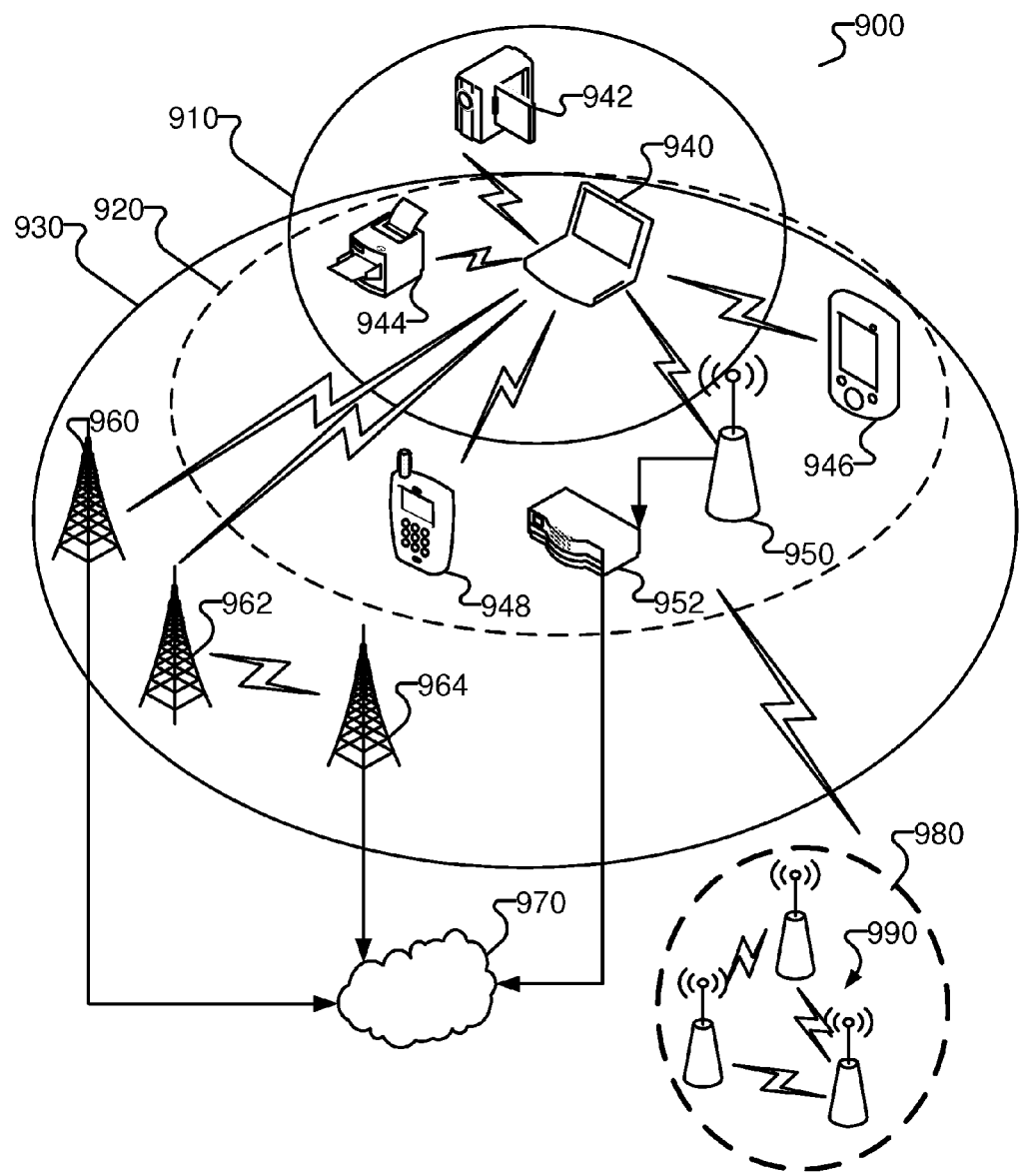
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
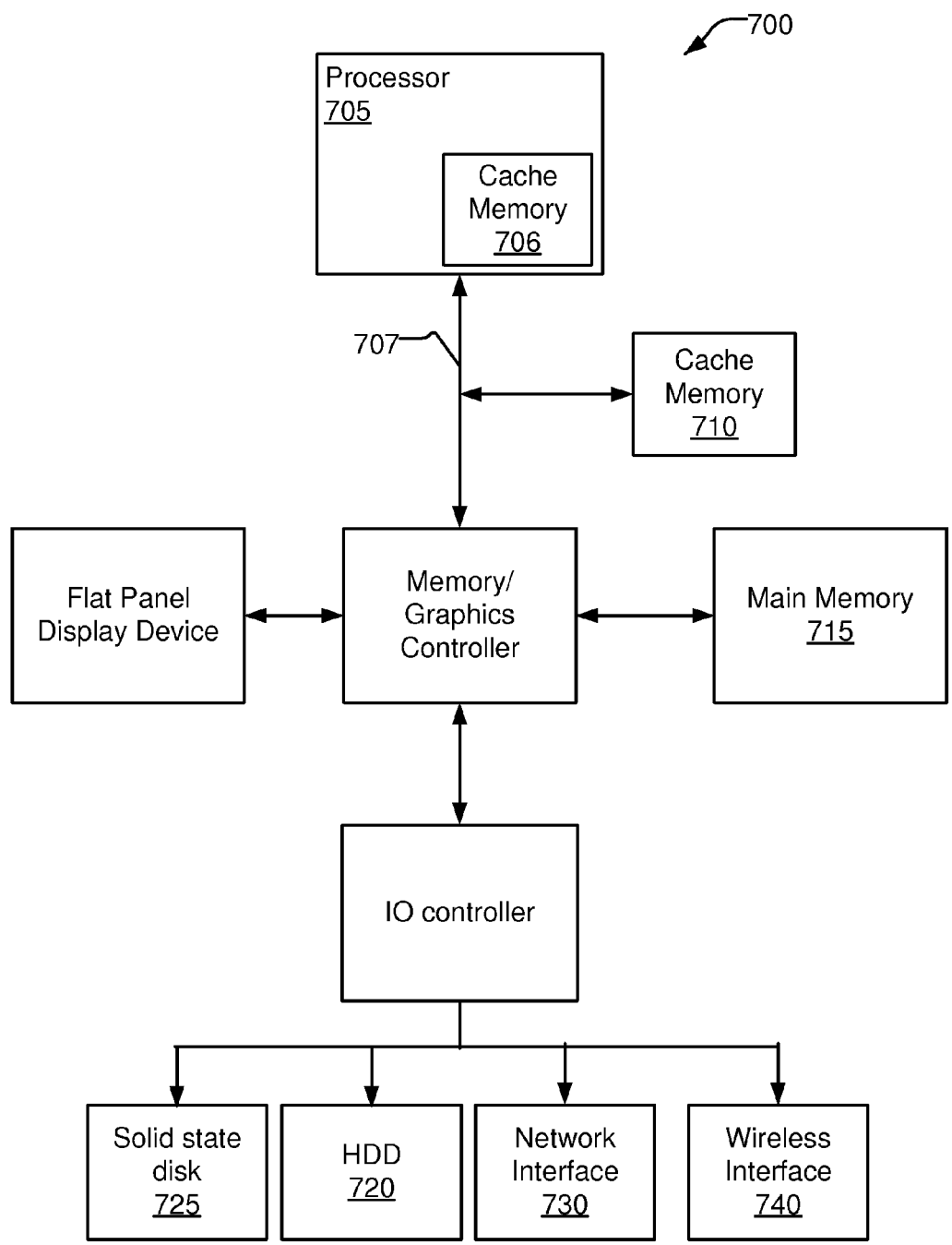
FIG. 5 illustrates a computer system for use with one embodiment of the present invention.

FIG. 5 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for a wireless communication network comprising:
   receiving, by a driver module on a mobile station, DHCP (Dynamic Host Configuration Protocol) information generated by a remote DHCP gateway and transmitted to the mobile station via a base station prior to the mobile station sending a DHCP discovery message;
   storing, by a driver module, the DHCP information;
   redirecting the DHCP discovery message from an operating system DHCP process to the driver module;
   performing DHCP hand-shaking in response to the DHCP discovery message, the driver module to intercept Internet Protocol (IP) configuration received from the wireless communication network to obtain an IP address instead of the operating system DHCP process and the driver module to receive the IP configuration from the wireless communication network during a registration phase of initial network entry via a registration response (REG-RSP) media access control (MAC) management message;
   wherein said performing DHCP hand-shaking comprises generating, by the driver module, a response to the DHCP discovery message without sending out a request to the remote DHCP gateway, communicating the DHCP information to the operating system DHCP process, and communicating a DHCP acknowledgment to the operating system DHCP process; and
   sending the IP configuration to the operating system DHCP process to allow the operating system to communicate with the wireless communication network using the IP address obtained by the driver module.

2. The method of claim 1, wherein the DHCP information comprises an IP address to be assigned to the mobile station and configuration data about a default gateway, a subnet mask, and a lease time.

3. The method of claim 1, wherein the driver module is associated with a transceiver in accordance with 802.16 m and is operable to perform part of IP allocation procedures without modification to operating system.

4. The method of claim 1, the driver module to generate a REG-REQ message indicating that the mobile station is capable of receiving the DHCP information in conjunction with a REG-RSP message.

5. A method for a wireless communication network comprising:
   generating by an ASN (access service network), in response to network entry associated with a mobile station, DHCP (Dynamic Host Configuration Protocol) information without receiving a DHCP discovery message from the mobile station; and
   propagating the DCHP information to the mobile station via a first base station;
   the mobile station to receive the DHCP information from the first base station network during an initial service flow setup via a dynamic service addition response (DSA-RSP) media access control (MAC) management message or after initial entry is completed and initial service flow is established via a dynamic service change response (DSC-RSP) media access control (MAC) management message;
   the ASN comprises a gateway to allocate a DHCP IP to the mobile station, and one or more base stations including the first base station to communicate with the mobile station and the gateway; and further comprising
   sending, by the gateway in conjunction with a MAC negotiation message, the DHCP information to at least one of the base stations, and
   propagating, by the at least one base station in conjunction with a registration message, the DHCP information to the mobile station.

6. The method of claim 5, wherein the DHCP information comprises an IP address to be assigned to the mobile station and configuration data.

7. The method of claim 5, further comprising propagating, by a base station, the DHCP information to the mobile station in conjunction with a message during a registration process after an authentication process.

8. The method of claim 5, wherein the MAC negotiation message is an MS attachment response and the registration message is an REG-RSP message.

9. The method of claim 5, further comprising:
   sending, by the gateway in conjunction with a path registration message, the DHCP information to a base station; and
   propagating, by the base station in conjunction with a service flow configuration message, the DHCP information to the mobile station.

10. The method of claim 9, wherein the path registration message is a PATH-REG response and the service flow configuration message is a DSA-RSP message.

11. The method of claim 5, further comprising:
   requesting, by the base station in conjunction with DHCP messaging, the DHCP information from the gateway; and
   propagating, by the base station in conjunction with a service flow change message, the DHCP information to the mobile station.

12. The method of claim 11, wherein the DHCP messaging includes a DHCP discovery message, a DHCP offer message, a DHCP request message, and a DHCP ACK message, wherein the service flow change message is a DSC-RSP message.

13. A network system comprising:
   a gateway to manage and to allocate IP addresses; and
   a base station to communicate with the gateway and to communicate wirelessly with a mobile station, the gateway to generate, in response to network entry by the mobile station, DHCP (Dynamic Host Configuration Protocol) information prior to receiving a DHCP message by the mobile station;
   the mobile station to receive the DHCP information from the base station network during an initial service flow setup via a dynamic service addition response (DSA-RSP) media access control (MAC) management message or after initial entry is completed and ISF is established via a dynamic service change response (DSC-RSP) media access control (MAC) management message;
   wherein the DHCP information is to be redirected and processed by a driver module rather than an operating system DHCP process;
   the gateway to send in conjunction with a MAC negotiation message the DHCP information to the base stations, and the base station to propagate in conjunction with a registration message the DHCP information to the mobile station.

14. The network system of claim 13, the base station to communicate the DCHP information to the mobile station in conjunction with one or more messages during a registration process, after an authentication process has completed but prior to a DHCP process by the mobile station.

15. The network system of claim 13, the base station to communicate the DCHP information to the mobile station in conjunction with one or more messages during a service flow configuration process prior to a DHCP process by the mobile station.

16. The network system of claim 13, the base station to receive an indication from the mobile station that the mobile station is capable of receiving the DHCP information in conjunction with a registration response message.

\* \* \* \* \*